(12) United States Patent
Pyrcz et al.

(10) Patent No.: US 8,355,898 B2
(45) Date of Patent: Jan. 15, 2013

(54) SYSTEM AND METHOD FOR MODELING FLOW EVENTS RESPONSIBLE FOR THE FORMATION OF A GEOLOGICAL RESERVOIR

(75) Inventors: Michael J. Pyrcz, Kingwood, TX (US); Tim R. McHargue, Danville, CA (US); Morgan Sullivan, Spring, TX (US); Julian Clark, Oakland, CA (US); Andrea Fildani, Danville, CA (US); Nick J. Drinkwater, Houston, TX (US); Henry W. Posamentier, The Woodlands, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 867 days.

(21) Appl. No.: 12/140,901

(22) Filed: Jun. 17, 2008

(65) Prior Publication Data
US 2009/0312995 A1    Dec. 17, 2009

(51) Int. Cl.
*G06F 17/50* (2006.01)
*G06F 7/60* (2006.01)
*G06G 7/48* (2006.01)

(52) U.S. Cl. .................. 703/10; 703/1; 703/2
(58) Field of Classification Search .......... 703/1, 2, 703/10
See application file for complete search history.

(56) References Cited

U.S. PATENT DOCUMENTS

| | | | |
|---|---|---|---|
| 7,392,166 B2* | 6/2008 | Le Ravalec-Dupin et al. | 703/10 |
| 7,676,326 B2* | 3/2010 | Podladchikov et al. | 702/11 |
| 7,933,750 B2* | 4/2011 | Morton et al. | 703/2 |
| 2003/0182093 A1* | 9/2003 | Jones et al. | 703/11 |
| 2007/0038421 A1 | 2/2007 | Hu | |
| 2007/0055447 A1 | 3/2007 | Mickaele et al. | |
| 2007/0255500 A1 | 11/2007 | Pita et al. | |

FOREIGN PATENT DOCUMENTS
EP    0 512 736    11/1992

OTHER PUBLICATIONS

"Stochastic surface modeling of deepwater depositional systems for improved reservoir models", Zhang, Pyrcz, Deutsch. May 5, 2008.*
Pyrcz, et al., Integration of Geologic Information into Geostatistical Models, University of Alberta (Canada), 2004, p. 1.

(Continued)

*Primary Examiner* — Omar Fernandez Rivas
*Assistant Examiner* — Nithya Janakiraman
(74) *Attorney, Agent, or Firm* — Carlos L. Hanze

(57) ABSTRACT

A system configured to model geometric architectures of flow events in geological reservoirs. In one embodiment, the system comprises a geological control input, a rules module, and a modeling module. The geological control input is configured to receive a set of environmental conditions that act as geological controls impacting a geometric architecture of a geological reservoir at a point in geologic time. The rules module is configured to apply a set of rules to the set of environmental conditions present at the point in geologic time to determine geometric flow parameters of the geometric architecture, wherein the set of rules comprise one or more empirical rules. The modeling module is configured to model the geometric architecture based on the geometric flow parameters determined for the flow event by the rules module.

15 Claims, 5 Drawing Sheets

OTHER PUBLICATIONS

Pyrcz, M.J., O. Catuneanu, and C.V. Deutsch, C.V., 2005, Stochastic Surface-Based Modeling of Turbidite Lobes, AAPG Bulletin, v. 89, No. 2 (Feb. 2005), pp. 177-191.

Pyrcz, M.J., M. Sullivan, N. Drinkwater, J. Clark, A. Fildani and M. Sullivan, this volume, Event-Based Models as a Quantitative Laboratory for Testing Quantitative Rules Associated with Deep-Water Distributary Lobes, GCSSEPM 26th Bob F. Perkins Research Conference, in press, 2006.

Pyrcz, M.J., O. Leuangthong and C.V. Deutsch, 2005, Hierarchical Trend Modeling for Improved Reservoir Characterization: International Association of Mathematical Geology Annual Conference, pp. 1-6.

Michael J. Pyrcz and Clayton V. Deutsch, Conditioning Event-Based Fluvial Models, Geostatistics Banff 2004, pp. 135-144.

Cojan, I., O. Fouche and S. Lopez, 2004, Process-Based Reservoir Modelling in the Example of Meandering Channel, Geostatistics Banff 2004, pp. 611-619.

Pyrcz, et al., Integration of Geologic Information into Geostatistical Models, University of Alberta (Cananda), 2004, p. 1.

M.J. Pranter, Z.A. Reza and P. Weimer: Deepwater Reservoir Modeling Using Sequence-Stratigraphic and Geomorphic Constraints, 2005 SPE Annual Technical Conference and Exhibition, Oct. 9-12, 2005, pp. 1-11.

Pyrcz, M.J., O. Catuneanu, and C.V. Deuisch, C.V., 2005, Stochastic Surface-Based Modeling of Turbidite Lobes, AAPG Bulletin, v. 89, No. 2 (Feb. 2005), pp. 177-191.

Pyrcz, M.J., M. Sullivan, N. Drinkwater, J. Clark, A. Fildani and M. Sullivan, this volume, Event-Based Models as a Quantitative Laboratory for Testing Quantitative Rules Associated with Deep-Water Distributary Lobes, GCSSEPM 26th Bob F. Perkins Research Conference, in press.

Reservior Characterization: Integrating Technology and Business Practices. 26th Annual Gulf Coast Section SEPM Foundation Bob F. Perkins Research Conference. Program and Abstracts Dec. 3-6, 2006.

Reservior Characterization: Integrating Technology and Business Practices. 26th Annual Gulf Coast Section SEPM Foundation Bob F. Perkins Research Conference. Table of Contents.

* cited by examiner

SYSTEM AND METHOD FOR MODELING FLOW EVENTS RESPONSIBLE FOR THE FORMATION OF A GEOLOGICAL RESERVOIR

FIELD OF THE INVENTION

The invention relates to the modeling of flow events responsible for the formation of a geological reservoir.

BACKGROUND OF THE INVENTION

Techniques for modeling reservoir architectures based on depositional and/or erosional events exist. Some of these techniques fall into one of two separate categories, cellular-based models that breakdown a reservoir into a series of cells and model flow events in the reservoir on a cell by cell basis, and vectorial-based models in which a centerline of a flow event through the reservoir is determined and the impact of the flow event on the geometric architecture of the reservoir is based around the path of this centerline.

In vectorial-based models, centerline paths are generally determined either stochastically or based on a previous geometric architecture of the reservoir (e.g., based on the steepest gradient). However, neither of these approaches alone provides a sufficient approximation of centerline paths. As a result, the accuracy of these vectorial-based modeling approaches may be impaired.

Once a centerline path through a reservoir is determined, conventional modeling techniques model a geobody associated with a flow event about the centerline. The shape of this geobody is generally determined based solely on predetermined parameters dictating the width, depth, etc. of the geobody. These parameters are usually not expressed in terms of the environmental conditions that impact the formation of geobodies in actuality, but instead are a function of the mathematical constructs implemented to form the geobody about the centerline path in the model. As a result, these parameters are generally not accessible, conceptually, for geologists, geophysicists, and/or other personnel without a relatively in-depth understanding of the mathematical constructs that define the geobody.

SUMMARY

One aspect of the invention relates to a system configured to model geometric architectures of flow events in geological reservoirs. In one embodiment, the system includes a model storage, a stochastic parameter module, a geological control input, a rules module, and a modeling module. The model storage is configured to store previously modeled geometric architectures of flow events in a geological reservoir, the previously modeled geometric architectures including a modeled geometric architecture of a first flow event in the geological reservoir, wherein the first flow event corresponds to a first point in geologic time. The stochastic parameter module is configured to stochastically determine one or more stochastic parameters that impact the geometric architecture of a second flow event that corresponds to a second point in geologic time that is later than the first point in geologic time, wherein the one or more stochastic parameters comprise a spectral centerline model that describes a proposed centerline for the second flow event through the geological reservoir. The geological control input is configured to receive environmental conditions that act as geological controls impacting the geometric architecture of flow events in the geological reservoir, the environmental conditions received by the geological control input including a set of environmental conditions present at the second point in geologic time. The rules module is configured to apply a set of rules to the set of environmental conditions present at the second point in geologic time to determine geometric flow parameters of the geometric architecture of the second flow event. The modeling module is configured to model the geometric architecture of the second flow event based on (i) the one or more stochastic parameters determined for the second flow event by the stochastic parameter module, (ii) the geometric flow parameters determined for the second flow event by the rules module, and (iii) the modeled geometric architecture of the first flow event that is stored by the model storage.

Another aspect of the invention relates to a system configured to model geometric architectures of flow events in geological reservoirs. In one embodiment, the system comprises a geological control inputs a rules module, and a modeling module. The geological control input is configured to receive a set of environmental conditions that act as geological controls impacting a geometric architecture of a geological reservoir at a point in geologic time. The rules module is configured to apply a set of rules to the set of environmental conditions present at the point in geologic time to determine geometric flow parameters of the geometric architecture, wherein the set of rules comprise one or more empirical rules. The modeling, module is configured to model the geometric architecture based oh the geometric flow parameters determined for the flow event by the rules module.

These and other objects, features, and characteristics of the present invention, as well as the methods of operation and functions of the related elements of structure and the combination of parts and economies of manufacture, will become more apparent upon consideration of the following description arid the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
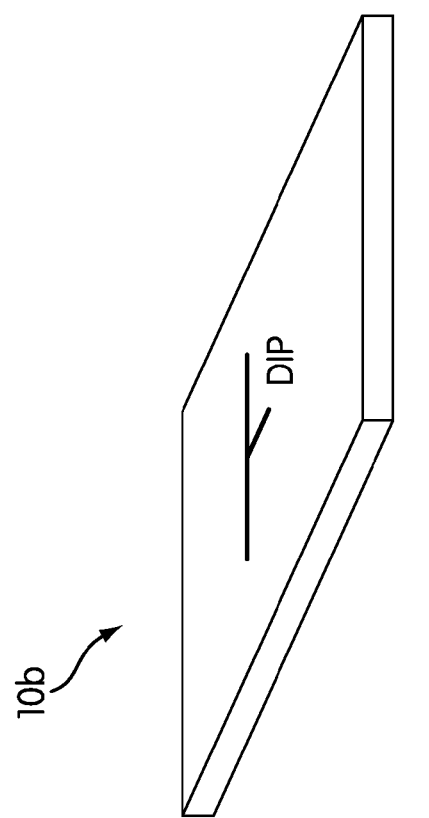
FIG. 1 illustrates baseline architectures for constructing a model of a reservoir, in accordance with one or more embodiments of the; invention.
Figure 1:
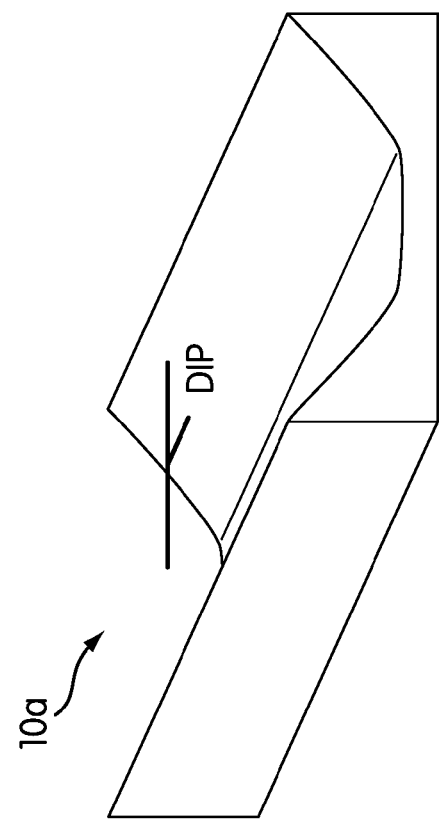

Below, a system and method configured to model geometric architectures of flow events in geological reservoirs; are described. In doing so, the geometric architectures of a reservoir are modeled sequentially from an initial point in geologic time, at which the reservoir has a baseline architecture, to some future point in geologic time after the initial point in geologic time. For example, FIG. 1 illustrates a pair of baseline architectures 10a and 10b present at some initial point in geologic time, from which reservoirs can be modeled. As can be seen in FIG. 1, baseline architecture 10a forms a confined reservoir, such as may be found in an incised fluvial valley and/or a deepwater slope valley. Baseline architecture 10b forms an unconfined reservoir, such as may be found in fluvial plains, coastal/deltaic areas, and/or deepwater basins.

Figure 2:
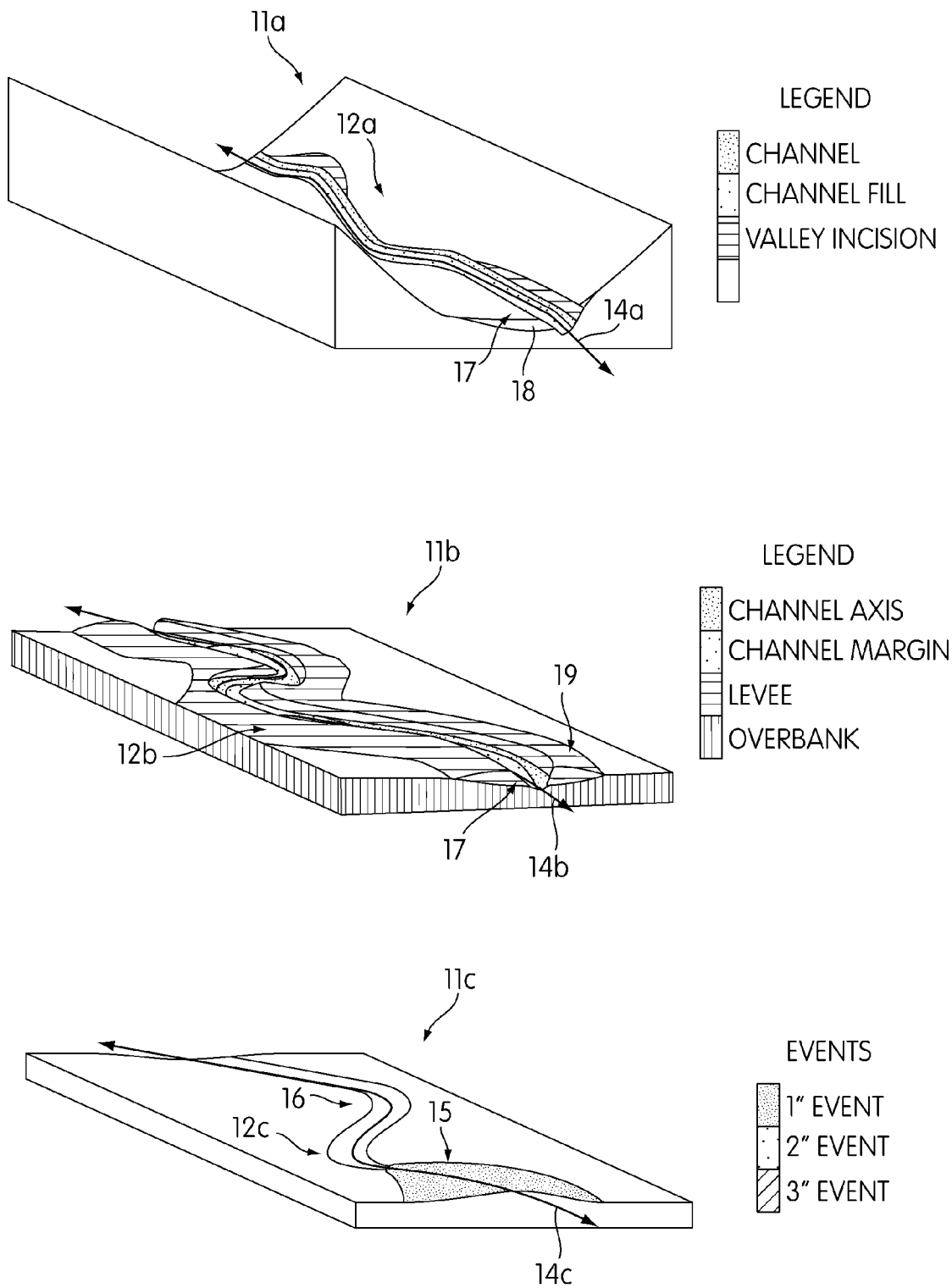
FIG. 2 illustrates exemplary modeled geometric architectures of reservoirs, according to one or more embodiments of the invention.

FIG. 2 illustrates 3 exemplary modeled geometric architectures of reservoirs 11a, 11b, and 11c at some time subsequent to the initial point in geologic time. Between the initial point in geologic, time and the point in geologic time reflected in FIG. 2, one or more flow events have caused alterations in the geometric architectures of reservoir 11a, 11b, and 11c. A flow event within a reservoir is the modification of the topography of the reservoir caused by a geobody within the reservoir between two points in geologic time. For example, FIG. 2 illustrates 3 geobodies 12a, 12b, and 12c, corresponding to the 3 reservoirs 11a, 11b, and 11c. A geobody is a three-dimensional geometry that impacts the topography of the reservoir in which it is situated through erosion and/of aggradation (e.g., a flow of water and/or geological materials). Generally, geobodies have internal properties that are a function of the setting at the geological time of deposition that impact the deposition of subsequent geobodies (e.g., erodability). Geobodies 12a, 12b, and 12c run along centerlines 14a, 14b, and 14c, respectively, which are an assigned central axis of a flow event within a reservoir.

The modeled geometric architectures illustrated in FIG. 2 may be described as the modeled geometric architecture of the flow event that has transpired between the initial point in geologic time and the subsequent point in geologic time. As can be seen in FIG. 2, alterations in the geometric architectures of reservoirs 11a, 11b, and 11c may include one or more structural elements caused by aggradation, erosion, and/or other related processes (e.g., avulsion, progradation, retrogradation, denudation, lateral accretion, downstream accretion, neck cutoff, chute cutoff, etc.) involving geobodies 12a, 12b, and 12c. These one or more structural elements may include a deposition 15 of sediment within and/or along a channel containing one of geobodies 12a, 12b, or 12c, an erosion 16 of sediment within and/or along a channel containing one of geobodies 12a, 12b, or 12c, the erosional and partial filling 17 of the channels containing geobodies 12a, 12b, or 12c, the deposition of uniform drapes 18 outside one or more of the channels containing geobodies 12a, 12b, or 12c, the deposition of levees 19 outside one or more of the channels containing geobodies 12a, 12b, or 12c, and/or other formations.

Figure 3:
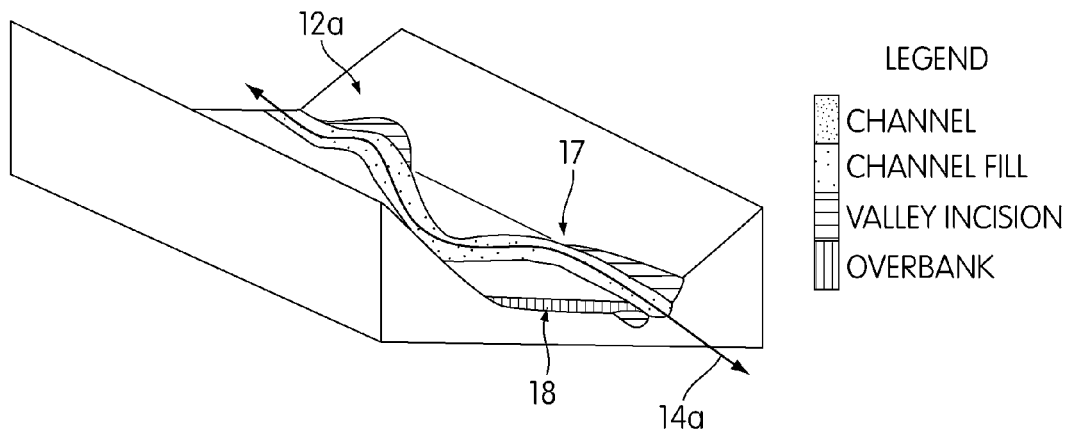
FIG. 3 illustrates exemplary modeled geometric architectures of reservoirs, according to one or more embodiments of the invention.
Figure 3:
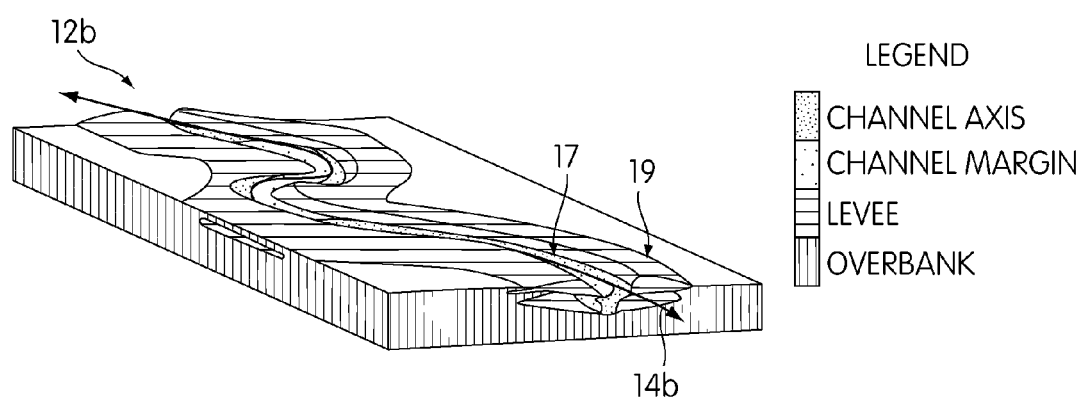
Figure 3:
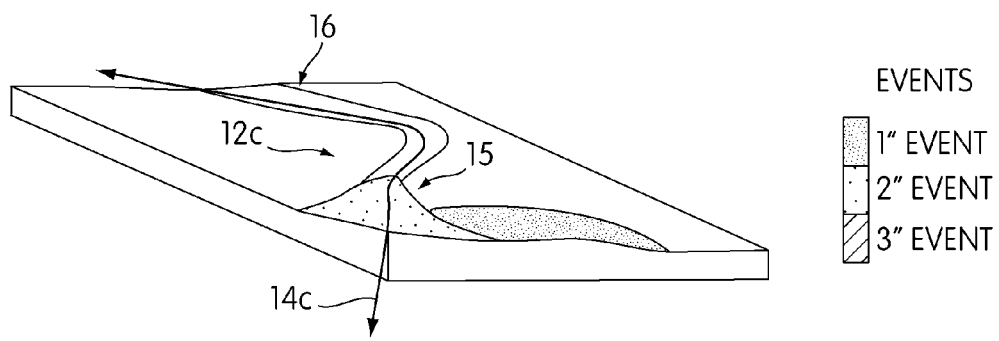

Between the point in geologic time represented in FIG. 2 and some further subsequent point in geologic time illustrated in FIG. 3, additional flow events involving, for example, geobodies 12a, 12b, and 12c, will occur, thereby further altering the models of the geometric architectures of reservoirs 11a, 11b, and 11c illustrated in FIG. 2. As can be seen in FIG. 3, such changes to the topography of reservoirs 11a, 11b, and 11c may include the erosion of one or more of the geological formations formed by the flow event modeled in FIG. 2, and/or may deposit one or more additional geological formations on top of the formations formed by the flow event modeled in FIG. 2. For consistency, formations and features illustrated in FIG. 3 have been labeled with references characters used to label similar formations and features illustrated in FIG. 2 (e.g., centerlines 14a-14c, deposition 15, erosion 16, partial filling 17, drapes 18, levees 19, etc.).

As can be seen in FIGS. 1-3, the models of the geometric architectures of reservoirs 11a, 11b, and 11c shown in FIG. 3 depend on the modeled geometric architectures of reservoirs 11a, 11b, and 11c illustrated in FIG. 2 similar to the manner in which the modeled geometric architectures of reservoirs 11a, 11b, and 11c illustrated in FIG. 2 depend on baseline architectures 10a and 10b illustrated in FIG. 1. This phenomena may be referred to as "the stacking patterns." Where the channels defined by geobodies 12a, 12b, and 12c are underfilled, modeling of subsequent flow events from FIG. 2, such as one or more of the flow events illustrated in FIG. 3, will result in organized channel stacking patterns. Where the channels defined by geobodies 12a, 12b, and 12c are overfilled in flow events subsequent to the flow event illustrated in FIG. 2, disorganized channel stacking patterns may arise in subsequent flow events like the ones illustrated in FIG. 3, as the channels defined by geobodies 12a, 12b, and 12c are overrun iii the subsequent flow events. Where the relief on levee 19 is significant relative to the size of subsequent flow events, compensational (repulsive) stacking patterns may arise, as one or more of geobodies 12a, 12b, and/or 12c are overrun in the subsequent flow events.

Referring now to FIG. 3, whether a given one of geobodies 12a, 12b, or 12c aggrades or erodes sediment at a given location in reservoirs 11a, 11b, or 11c may be dictated by an equilibrium profile of reservoirs 11a, 11b, or 11c at a given point in geologic time. The equilibrium profile may be a surface defined with respect to the topography of a reservoir (e.g., at a given height above sea level) above which a geobody passing through the reservoir will tend to erode the sediment of the reservoir, and below which the geobody will tend to aggrade the sediment of the reservoir. The position and/or shape of the equilibrium profile of the reservoir will be a function of allogenic forces, which are dependent oh environmental conditions external to the reservoir (e.g., sea level, tectonic activities and/or conditions, climate conditions, etc.).

Figure 4:
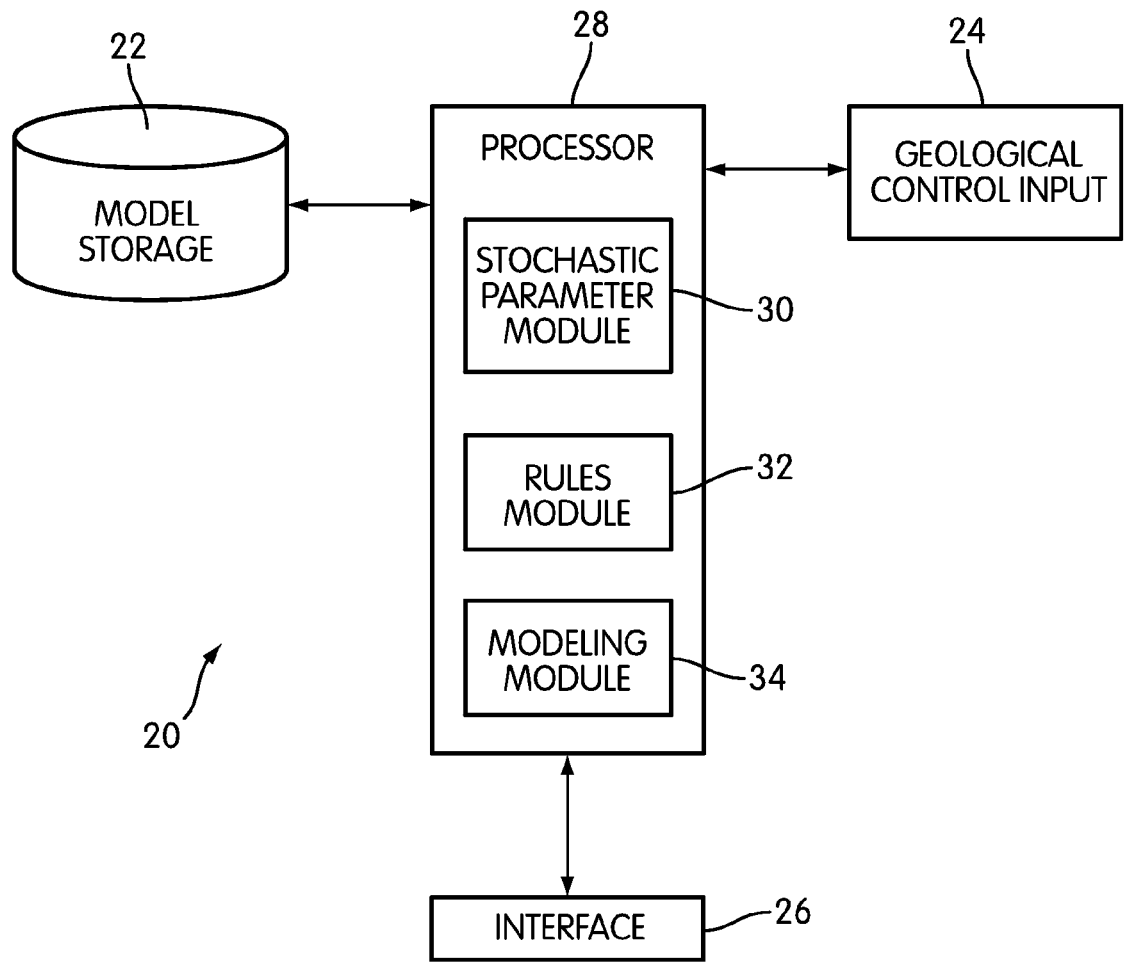
FIG. 4 illustrates a system configured to model geometric architectures of flow events in geological reservoirs, in accordance with one or more embodiments of the invention.

FIG. 4 illustrates a system 20 configured to model geometric architectures of flow events in geological reservoirs, System 20 enables the model of the geometric architecture of a reservoir at a given point in geologic time to be determined based on the topology of the reservoir at a previous point in geologic time, one or more stochastic parameters, one or more environmental conditions that act as geological controls on the geometric architecture of the reservoir, a set of empirical rules that describe the impact of the environmental conditions on the geometric architecture of the reservoir, and/or other parameters. In one embodiment, system 20 includes model storage 22, a geological control input 24, an interface 26, and a processor 28.

Model storage 22 is configured to store previously modeled geometric architectures of one or more reservoirs and/or flow events therein. Model storage 22 includes one or more electronic media on which the previously modeled geometric architectures are stored, and/or the processing infrastructure for managing and organizing the storage of the modeled geometric architectures to the one or more electronic media. By way of example, the electronically readable storage media of model storage 22 may include one or both of system storage that is provided integrally (i.e., substantially non-removable) with system 20 and/or removable storage that is removably connectable to system 20 via, for example, a port (e.g., a USB port, a fire wire port, etc.) or a drive (e.g., a disk drive, etc;). Model storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.),.solid-state storage media (e.g., flash drive, etc.), and/or other electronically readable storage media. Model storage 22 may be a separate component within system 20, or model storage 22 may be provided integrally with one or more of geological control input 24, interface 26, and/or processor 28.

Geological control input 24 provides an interface through which information related to environmental conditions for a given reservoir at a given point (or period) in geologic time may be input to system 20. As will be discussed further below, such information may be implemented in the determination of geometric models of flow events within the given reservoir. Examples of interface devices suitable that may be included in geological control input 24 include a keypad, buttons, switches, a keyboard, knobs, levers, a display screen, a touch screen, and/or a microphone.

It is to be understood that other communication techniques, either hard-wired or wireless, are also contemplated by the present invention as geological control input 24. For example, the present invention contemplates that geological control input 24 may be integrated with a removable storage interface provided by model storage 22. In this example, information may be loaded into system 20 from removable storage (e.g., a smart card, a flash drive, a removable disk, etc.) that enables the user(s) to customize the implementation of system 20. Other exemplary input devices and techniques adapted for use with system 20 as geological control input 24 include, but are not limited to, an RS-232 port, RF link, an IR link, modem (telephone, cable or other), a network link with a data source, etc In short, any technique for communicating information with system 20 is contemplated by the present invention as geological control input 24.

The environmental conditions received into system, 20 via geological control input 24 may include environmental conditions that act as geological controls impacting the geometric architecture of flow events in geological reservoirs. As has been discussed above, these environmental conditions may impact, for example, allogenic forces that control aspects of topography formation caused by flow events. Some non-limiting examples of such environmental conditions include sea level, one or more tectonic conditions, one or more climate conditions (e.g., humidity, temperature, wind conditions, dew point, etc.), a distribution of sediment types, discharge(e.g., the volume and/or composition of geologic materials and water entering the model), and/or other environmental conditions.

Interface 26 enables interaction between system 20 and a user. Accordingly, interface 26 may include one or more interface devices that enable the user to input information to system 20 (e.g., one or more of the interface devices discussed above with respect to geological control input 24) and/or one or more interface devices that enable the user to receive information from system 20 (e.g., a speaker, a display screen, signal lights/LEDs, etc.). As used here, the term "information" may include data, results, instructions, commands, and/or other communicable items. In one embodiment, at least one of the one or more interface devices that enable the user to input information to system 20 of interface 26 is shared in common with geological control input 24. In one embodiment, interface 26 is formed separately and discretely from geological control input 24.

Processor 28 is configured to provide information processing capabilities in system 20. As such, processor 28 may include one or more of a digital processor, an analog processor, a digital circuit designed to process information, an analog circuit designed to process information, a state machine, and/or other mechanisms for electronically processing information. Although processor 28 is shown in FIG. 4 as a single entity, this is for illustrative purposes only. In some implementations, processor 28 may include a plurality of processing units. These processing units may be physically located within the same device, or processor 28 may represent processing functionality of a plurality of devices operating in coordination.

As is shown in FIG. 4, in one embodiment, processor 28 includes a stochastic parameter module 30, a rules module 32, and a modeling module 34. Modules 30, 32, and 34 may be implemented in software; hardware; firmware; some combination of software, hardware, and/or firmware; and/or otherwise implemented. It should be appreciated that although modules 30, 32, and 34 are illustrated in FIG. 4 as being co-located within a single processing unit, in implementations in which processor 28 includes multiple processing units, modules 30, 32, and/or 34 may be located remotely from the other modules.

Stochastic parameter module 30 is configured to stochastically determine one or more stochastic parameters that impact the geometric architecture of a geological reservoir and/or a flow event within the geological reservoir. The one or more stochastic parameters may be related to a geobody within a reservoir. For example, the one or more parameters may include an entrance location of a geobody into a reservoir, an exit location of a geobody out of a reservoir, a frequency of a spectral centerline of a geobody within a reservoir, a centerline path of a geobody within a reservoir, and/or other parameters related to a geobody within a reservoir. In one embodiment, the one or more stochastic parameters related to a geobody within a reservoir may describe one or more aspects of the geobody within the reservoir at a given point in geologic time. The one or more stochastic parameters may be dependent in part on some or all of the same one or more aspects of a geobody present within the reservoir at a previous point in geologic time, and/or on characteristics of the topography of the reservoir at the given point in geologic time or at the previous point in geologic time.

Rules module 32 is configured to apply a set of rules to a set of environmental conditions present at a point in geologic time to determine geometric flow parameters of flow event at or near the geologic time. The set of environmental conditions are received into system 20 via geological control input 24. The application of the set of rules by rules module 32 to the received set of environmental conditions, in one embodiment, may be conceptualized as a mapping of the received set of environmental conditions present at a given point in geologic time into the geometric flow parameters that define (or at least contribute to) one or more aspects of geobodies present at the given point in geologic time. The rules may be stored by system 20, and/or received from a user (e.g., via interface 26).

The geometric flow parameters determined by rules, module 32 are parameters that define (or at least contribute to) one or more aspects of a flow event, including one or more aspects of a geobody involved in the flow event. For example, the geometric flow parameters determined by rules module 32 may include one or more of a channel size parameter, a fractional fill parameter, an equilibrium profile, a channel spectrum and/or sinuosity, channel fill trends, erodability, an aggradation rate, and/or other parameters that define or contribute to aspects of a geobody.

The rules applied by rules module 32 include rules that are empirical and observation based, rather than mathematically based, and are entered to system 20 and/or adjusted within system 20 in an intuitive manner. The rules may be manually entered and/or adjusted lexically by a user with experience and/or knowledge of the general impact of environmental conditions on geobodies without precise mathematical formulations of these relationships.

For example, one rule may describe a relationship between sea level and a change in equilibrium profile and/or discharge. This rule may dictate that falling sea levels result corresponding amounts of lowering of the equilibrium profile near a source location and/or corresponding increases in discharge. The relationship(s) between sea level and equilibrium profile and/or discharge can be represented to and/or changed by a user based on their observations with respect to sea levels and equilibrium profiles and/or discharge in a lexical and intuitive manner. By making adjustments to these relatively simple and intuitive relationships, modeled flow, events are impacted in relatively sophisticated ways without forcing the user to manipulate, or even access the complicated mathematical algorithms underlying the modeling. For instance, a drop in sea level, and the corresponding changes in equilibrium profile and discharge would lead to increased incision of modeled channels, increased discharge at a specific rate, and under-filled channels at a specific fraction of fill, which may, in turn, result in organized channels with limited sand preservation within channels.

As another example of rules that may be implemented by rules module 32, a user may enter and/or adjust a rule that specifies a relationship between channel sinuosity (expressed in the modeling the magnitude of the centerline spectrum) and the gradient of the topography of the reservoir being modeled. For example, the rule can be adjusted such that decreases in gradient over some ranges of gradient result in a corresponding increase in channel sinuosity. By adjusting this simple and intuitive relationship, an underlying (less intuitive) link between changes in gradient (e.g., due to tectonic changes) and Channel incision caused by channel meander that leads to increases in broad amalgamated sand units with organized channel stacking patterns and increased preservation potential for marginal channel fill components.

Modeling module 34 is configured to model the geometric architecture of a flow event in a reservoir based on one or more of (i) stochastic parameters of the flow event determined by stochastic parameter, module 30, (ii) geometric flow parameters determined by rules module 32 based on environmental conditions at the point in geologic time corresponding to the flow event being modeled, (iii) a modeled geometric architecture of the reservoir prior to the flow event being modeled, and/or other considerations. In one embodiment, modeling module 34 models the geometric architecture, of the flow event in the reservoir by determining a centerline of a geobody through the reservoir, determining the shape of the geobody about the centerline, and determining a model of the geometric architecture of the reservoir that accounts for the impact of the geobody on the previous geometric architecture of the reservoir. Models of the geometric architecture of flow events and/or reservoirs may be stored to model storage 22.

In one embodiment, modeling module 34 determines the centerline of the geobody based on one or more stochastic parameters received from stochastic parameter module 32 and the modeled geometric architecture: of the reservoir prior to the flow event being modeled. In such an embodiment, the one or more stochastic parameters received from stochastic parameter module 32 may include a proposed centerline for the geobody. Based on existing modeled geometric architecture of the reservoir (e.g., from a previous point in geologic time), the proposed centerline for the geobody may be adjusted by modeling module 34. For example, points along the proposed centerline may be inspected to ensure that the centerline of the geobody honors general constraints on flow (e.g., constraints oh uphill flow based on gradient analysis of the existing geometric architecture). Where the proposed centerline does not conform to the requisite constraints, modeling module 34 adjusts the path of the proposed centerline to ensure that, the resulting centerline will be hydraulically driven and consistent with topographic constraints of the reservoir. The resulting centerline typically will be neither entirely stochastic (unless the existing geometric architecture is relatively flat), nor conform uniformly to a steepest gradient path from the source through the reservoir.

Once the centerline of the geobody through the reservoir is determined by modeling module 34, modeling module 34 may determine the shape of the geobody about the centerline. The shape of the geobody about the centerline may be determined based on, for example, one or more geometric flow parameters received from rules module 32 and the modeled geometric architecture of the reservoir prior to the flow event being modeled. By way of illustration, the cross-section of the geobody at a given location along the centerline will be determined, in part, as a function of the surface of the reservoir at the given location, as well as the gradient of the reservoir surrounding the given location (e.g., cross-section will be relatively larger where the flow rate of the geobody, as approximated by surface gradient, through the given location is relatively greater). As another example, the shape of the geobody will also be impacted by a channel size parameter, a fractional fill parameter, an equilibrium profile, an aggradation rate, and/or other parameters received from rules module 32 for the point in geologic time corresponding to the flow event being modeled.

After determining the shape of the geobody about the centerline, modeling module 34 models the geometric architecture of the flow event by determining a geometric architecture of the reservoir that accounts for the impact of the geobody on the preexisting geometric architecture of the reservoir. The geometric architecture of the flow event may include a topography of the reservoir that reflects the impact of the flow event, information related to the base of the reservoir (e.g., composition, properties, etc.), and/or an erosion map of the reservoir. The erosion map of the reservoir may be a map of the reservoir that represents the probability of the geobody entering a location in the reservoir. The values of the reservoir map may run from 1 to 0. The erosion map of the reservoir may be determined as a function of topographic height with respect to the equilibrium profile. Points below the equilibrium profile may be assigned a relatively high value (e.g., 1), and values of the erosion map may be linearly interpolated up to 0 for topographic heights above the equilibrium profile. Information determined by modeling module 34 with respect to the flow event (e.g., the topography of the reservoir, information related to the base of the reservoir, the erosion map, etc.) maybe stored to model storage 22.

Figure 5:
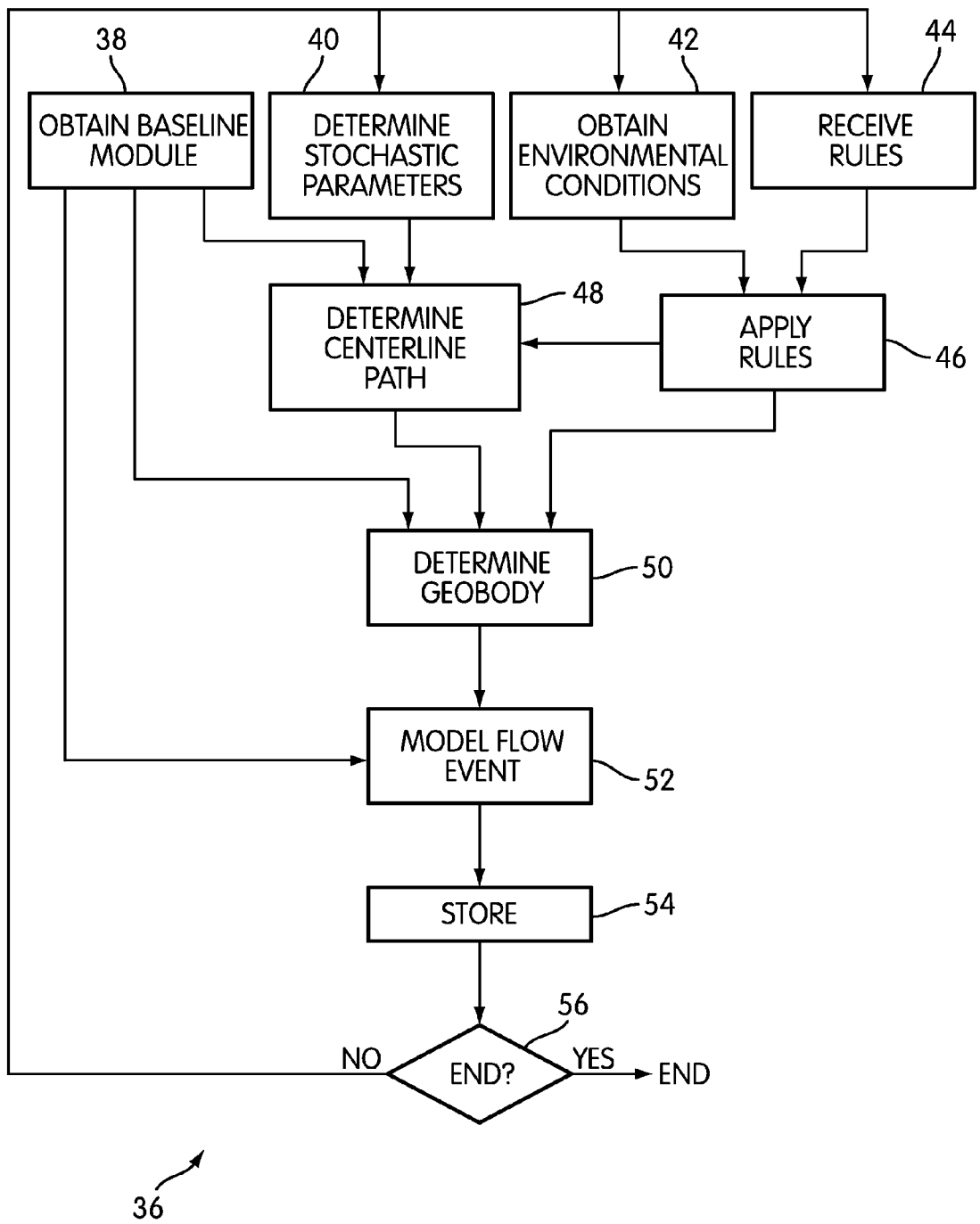
FIG. 5 illustrates a method of modeling geometric architectures of flow events in a geological reservoir, according to one or more embodiments of the invention.

FIG. 5 illustrates a method 36 of modeling geometric architectures of flow events in a geological reservoir. Although the operations of method 36 are discussed below with respect to the components of system 20 described above and illustrated in FIG. 4, it should be appreciated that this is for illustrative purposes only, and that method 36 may be implemented with alternative components and/or systems without departing from the scope of this disclosure. Further, the operations of method 36 presented below are intended to be illustrative. In some embodiments, method 36 may be accomplished with one or more additional operations not described, and/or without one or more of the operations discussed. Additionally, the order in which the operations of method 36 are illustrated in FIG. 5 and described below is not intended to be limiting.

At an operation 38, a baseline model of the reservoir is obtained. The baseline model of the reservoir may represent one or more of the geometric architecture, composition, and/or other aspects of the reservoir at some initial point in geologic time (where the flow event corresponds to a point in geologic time that is subsequent to the initial point in geologic time). In one embodiment, the baseline model may be obtained from a model storage that is similar to, or the same as, model storage 22 (shown in FIG. 4 and described above).

At an operation 40, one or more stochastic parameters that impact the geometric architecture of the flow event within the geological reservoir are determined. The one or more stochastic parameters may include one or more of an entrance location of a geobody into the reservoir, an exit location of a geobody from the reservoir, a frequency of a spectral centerline of a geobody within the reservoir, a proposed centerline path of a geobody through the reservoir, and/or other parameters. In one embodiment, operation 40 is performed by a stochastic parameter module that is the same as, or similar to stochastic parameter module 30 (shown in FIG. 4 and described above).

At an operation 42, environmental conditions present at the point in geologic time corresponding to the flow event are obtained. The environmental conditions may include environmental conditions that act as geological controls impacting the geometric architecture of flow events in the reservoir; In one embodiment, the environmental conditions may be obtained via a geological control input that is the same as, or similar to, geological control input 24 (shown in FIG. 4 and described above).

At an operation 44, a set of rules and/or adjustments to the rules may be obtained. The set of rules may map environmental conditions that act as geological controls impacting the geometric architecture of flow events in the reservoir to geometric flow parameters that define (or at least contribute to) one or more aspects of geobodies. The rules are lexical, and are empirical and observation based, rather than mathematically based. As such, the rules can be entered and/or adjusted lexically at operation 44 in an intuitive manner by a user with experience and/or knowledge of the general impact of environmental conditions on geobodies, without providing precise mathematical formulations of these relationships. In one embodiment, the rules and/or the adjustments the rules are received via an interface that is the same as or similar to interface 26, (shown in FIG. 4 and described above).

At an operation 46, the rules from operation 44 are-applied to the environmental conditions obtained at operation 44 to determine a set of geometric flow parameters that contribute to one or more aspects of a geobody involved in the flow event. In one embodiment, operation 46 is performed by a rules module that is the same as, or similar to, rules module 32 (shown in FIG. 4 and described above).

At an operation 48, a path of a centerline of a geobody through the reservoir is determined. The path of the centerline of the geobody through the reservoir is determined at operation 48 based on at least one of the one or more stochastic parameters determined at operation 40, the baseline model of the reservoir obtained at operation 38, and/or at least one of the geometric flow parameters determined at operation 46. In one embodiment, operation 48 is performed by a modeling module that is the same as, or similar to, modeling module 34 (shown in FIG. 4 and described above).

At an operation 50, the type and shape of a geobody is determined about the centerline path determined at operation 42. The shape of the geobody about the centerline path may be determined based on one or more of the path of the centerline, the baseline model of the reservoir, and/or the geometric, flow parameters determined at operation 46. In one embodiment, operation 50 is performed by a modeling module that is the same as, or similar to, modeling module 34 (shown in FIG. 4 and described above).

At an operation 52; the geometric architecture of the flow event is modeled. Modeling the geometric architecture of the flow event includes determining a geometric architecture of the reservoir that accounts for the impact of the geobody (determined at operation 50) on the baseline model. At operation 52, information related to the base of the reservoir subsequent to the flow event, and/or an erosion map of the flow event may be determined. In one embodiment, operation 52 is performed by a modeling module that is the same as* or similar to, modeling module 34 (shown in FIG. 4 and described above).

At an operation 54, the information determined at operation 52 is stored. In one embodiment, the information is stored to a model storage that is the same as, or similar to model storage 22.

At an operation 56, a determination is made as to whether the modeling of the reservoir is complete. If the modeling of the reservoir is complete, method 36 ends. If the modeling of the reservoir is not complete, method 36 returns to operations 40,42, and 44, method 36 proceeds to model another, subsequent, flow event in the reservoir. During this next iteration of method 36, the geometric architecture of the flow event modeled at operation 52 and stored at operation 54 is used in place of the baseline model obtained at operation 38.

Although the invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to model a geometric architecture of a geological reservoir, the geometric architecture resulting from modifications of a topography of the geological reservoir caused by a geobody within the geological reservoir acting between a first point in geologic time and a second point in geologic time, the geobody being a three-dimensional geometry that impacts the topography of the reservoir, and the first and second points in geologic time representing a time between distinct topographic modifying events, the system comprising:

a model storage configured to store a previously modeled geometric architecture of the geological reservoir, the previously modeled geometric architecture including a modeled geometric architecture having a first modification of the topography of the geological reservoir caused by the geobody at the first point in geologic time;

a stochastic parameter module configured to stochastically determine one or more stochastic parameters that impact the geometric architecture as a result of a second modification of the topography caused by the geobody at the second point in geologic time that is later than the first point in geologic time, and wherein the one or more stochastic parameters comprise a spectral centerline model that describes a proposed centerline for the second flow event through the geological reservoir, wherein the spectral centerline model is adjustable so that the proposed centerline is consistent with topographic constraints of the geological reservoir;

a geological control input configured to receive environmental conditions that act as geological controls impacting the geometric architecture of modifications in the geological reservoir, the environmental conditions received by the geological control input including a set of environmental conditions present at the second point in geologic time;

a rules module configured to apply a set of rules to the set of environmental conditions present at the second point in geologic time to determine geometric flow parameters of the geometric architecture of the second modification of the topography; and a modeling module configured to model the geometric architecture of the second modification of the topography based on (i) the one or more stochastic parameters determined for the second modification of the topography by the stochastic parameter module, (ii) the geometric flow parameters determined for the second modification of the topography by the rules module, and (iii) the modeled geometric architecture of the first modification of the topography that is stored by the model storage.

2. The system of claim 1, wherein the environmental conditions received by the geological control input comprise one or more of sea level, a tectonic condition, a climate condition, a sediment type, or a discharge.

3. The system of claim 1, wherein the geometric flow parameters determined by the rules module comprise one or more of a channel size parameter, a fractional fill parameter, an equilibrium profile, channel spectrum, sinuosity, channel fill trends, erodability, or an aggradation rate.

4. The system of claim 1, wherein the modeling module is configured to model the geometric architecture of the second modification of the topography in part by determining a centerline of the second modification of the topography based on the spectral centerline module and the modeled geometric architecture of the first modification of the topography stored by the model storage.

5. The system of claim 4, wherein the modeling module is configured to model the geometric architecture of the second modification of the topography in part by determining the shape of the geobody running through the geological reservoir along the centerline, and wherein the geobody is a three-dimensional geometry that modifies the topography of the geological reservoir by erosion and/or aggradation.

6. The system of claim 5, wherein the modeling module determines the shape of the geobody based on the geometric flow parameters determined by the rules module, the centerline, and the geometric architecture of the first modification of the topography at and/or near the centerline.

7. The system of claim 1, wherein the set of rules applied by the rules module are empirical.

8. A system configured to model a geometric architecture of a geological reservoir, the geometric architecture resulting from a modification of a topography of the geological reservoir caused by a geobody within the geological reservoir, the geobody being a three-dimensional geometry that impacts the topography of the reservoir, the system comprising:

a geological control input configured to receive a set of environmental conditions that act as geological controls impacting the geometric architecture of the geological reservoir at a point in geologic time, wherein the geologic time corresponds to a distinct topographic modifying event;

a rules module configured to apply a set of rules to the set of environmental conditions present at the point in geologic time to determine geometric flow parameters of the geometric architecture of the modification of the topography, the set of rules comprise one or more empirical rules; and a modeling module configured to model a geometric architecture of the modification of the topography based on the geometric flow parameters determined for the modification of the topography by the rules module.

9. The system of claim 8, wherein the environmental conditions received by the geological control input comprise one or more of sea level, a tectonic condition, a climate condition, a sediment type, or a discharge.

10. The system of claim 8, wherein the geometric flow parameters determined by the rules module comprise one or more of a channel size parameter, a fractional fill parameter, an equilibrium profile, channel spectrum, sinuosity, channel fill trends, erodability, or an aggradation rate.

11. The system of claim 8, further comprising an interface configured to enable a user to input and/or configure at least one of the rules applied by the rules module.

12. The system of claim 11, wherein the interface enables the user to input and/or configure the at least one of the rules applied by the rules module lexically.

13. A system configured to model a geometric architecture of a geological reservoir, the system comprising:

a model storage configured to store a previously modeled geometric architecture of the geological reservoir including, the previously modeled geometric architecture corresponding to a first distinct point in geologic time;

a stochastic parameter module configured to stochastically determine one or more stochastic parameters that impact the geometric architecture of the geological reservoir at a second distinct point in geologic time that is later than the first point in geologic time, wherein the first and second points in geologic time represent a time between distinct topographic modifying events, and wherein the one or more stochastic parameters comprise a spectral centerline model that describes a proposed centerline of a geobody through the geometric architecture of the geological reservoir at the second point in geologic time, wherein the geobody is a three dimensional geometry that causes a modification of a topography of the geological reservoir between the first and second geologic times, and wherein the spectral centerline model is adjustable so that the proposed centerline is consistent with topographic constraints of the geological reservoir; and a modeling module configured to model the geometric architecture of the geological reservoir at the second point in geologic time, wherein modeling the geometric architecture of the geological reservoir at the second point in geologic time comprises modeling a centerline of the geobody through the geometric architecture of the geological reservoir at the second point in time based on the one or more stochastic parameters determined by the stochastic parameter module, and the modeled geometric architecture of the geological reservoir corresponding to the first point in geologic time that is stored by the model storage.

14. The system of claim 13, wherein the geobody is a three-dimensional geometry that modifies the topography of the geological reservoir by erosion and/or aggradation.

15. The system of claim 13, wherein modeling the geometric architecture of the geological reservoir at the second point in geologic time comprises determining the shape of the geobody about the centerline based on the modeled geometric architecture of the geological reservoir corresponding to the first point in geologic time that is stored by the model storage.

* * * * *